United States Patent
Rautiainen

(10) Patent No.: US 9,570,925 B2
(45) Date of Patent: Feb. 14, 2017

(54) APPARATUS FOR SELECTIVELY SUPPORTING AND CHARGING AN ELECTRONIC DEVICE IN A PORTRAIT POSITION AND A LANDSCAPE POSITION

(71) Applicant: Nokia Corporation, Espoo (FI)

(72) Inventor: Jukka Rautiainen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 781 days.

(21) Appl. No.: 13/706,003

(22) Filed: Dec. 5, 2012

(65) Prior Publication Data

US 2014/0152244 A1   Jun. 5, 2014

(51) Int. Cl.
H02J 7/00 (2006.01)
H02J 5/00 (2016.01)
H02J 7/02 (2016.01)
H04M 1/04 (2006.01)

(52) U.S. Cl.
CPC .............. *H02J 7/0044* (2013.01); *H02J 5/005* (2013.01); *H02J 7/025* (2013.01); *H04M 1/04* (2013.01)

(58) Field of Classification Search
CPC .......... H02J 5/005; H02J 7/0044; H02J 7/025; H04M 1/04
USPC ....................................................... 320/108
See application file for complete search history.

(56) References Cited

U.S. PATENT DOCUMENTS

| | | | |
|---|---|---|---|
| 7,708,240 B2 | 5/2010 | Homer et al. | |
| 2007/0035917 A1* | 2/2007 | Hotelling et al. | 361/683 |
| 2010/0081473 A1 | 4/2010 | Chatterjee et al. | |
| 2010/0177476 A1 | 7/2010 | Hotelling et al. | |
| 2012/0106054 A1* | 5/2012 | Royz et al. | 361/679.3 |
| 2012/0126745 A1* | 5/2012 | Partovi et al. | 320/108 |
| 2012/0170212 A1 | 7/2012 | Gallouzi et al. | |
| 2013/0058023 A1* | 3/2013 | Supran | G06F 1/1632 361/679.01 |
| 2013/0342159 A1* | 12/2013 | Paschke | F16M 11/041 320/108 |

OTHER PUBLICATIONS

Alba, "Bracketron Unveils MetalDock, Minimalist Charging Dock for iPhone 4/4S", Laptop, May 9, 2012, 3 pages.
PureGear Kickstand Case and Holster for iPhone 4/4S, Apple Fashion, Mar. 14, 2012, 4 pages.

* cited by examiner

*Primary Examiner* — Yalkew Fantu
*Assistant Examiner* — Manuel Hernandez
(74) *Attorney, Agent, or Firm* — Hollingsworth Davis, LLC

(57) ABSTRACT

In accordance with an example embodiment of the present invention, an apparatus comprises an open frame comprising first and second members respectively comprising first and second channels. The second member is longer than the first member. A support arrangement comprises a base attached to the first member and projects in a rearward direction therefrom. The base is configured to support the open frame in a portrait position when the apparatus is in a first orientation, and to support the open frame in a landscape position when the apparatus is in a second orientation. First and second flanges respectively project in a frontward direction from the first and second members. A detachable wireless charging plate comprises first and second edge surfaces configured to respectively fit within the first and second channels of the open frame. The detachable wireless charging plate serves as a backrest of the apparatus.

18 Claims, 9 Drawing Sheets

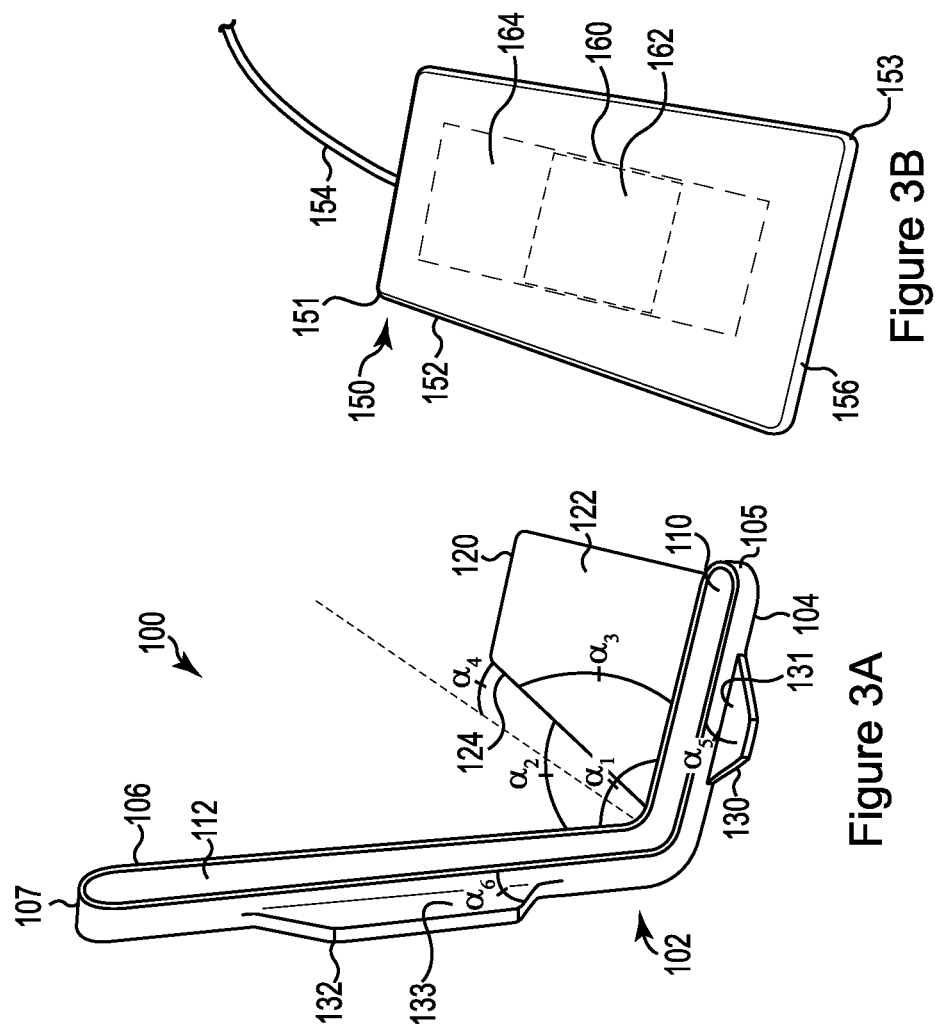

ND A LANDSCAPE POSITION

TECHNICAL FIELD

The present application relates generally to stands configured to hold an object in a portrait position and a landscape position.

BACKGROUND

Personal mobile devices are increasingly popular with consumers. A wide variety of mobile devices are available on the market, with smartphones currently being among the most widely adopted mobile devices. Various mobile devices are designed for use in both portrait and landscape positions. For applications that require hand-held manipulation, a user can easily change the orientation of a mobile device between portrait and landscape orientations as desired. Because many mobile devices utilize a rechargeable battery, a charging station can be used to recharge the batteries of such devices when necessary. The recharging process can be lengthy, during which the mobile device being recharged is not readily usable due to impediments presented by the charging station, particularly when changing between portrait and landscape positions is desired.

SUMMARY

Various aspects of examples of the invention are set out in the claims.

According to a first aspect of the present invention, an apparatus comprises an open frame comprising a first member and a second member. The first and second members respectively comprise a first channel and a second channel. The second member has a length longer than that of the first member and is connected thereto, such that an angle is defined between the first and second channels. A support arrangement comprises a base attached to the first member and projects in a rearward direction therefrom. The base is configured to support the open frame in a portrait position and in a landscape position. A first flange projects in a frontward direction from the first member, and a second flange projects in a frontward direction from the second member. A detachable wireless charging plate comprises first and second edge surfaces configured to respectively fit within the first and second channels of the open frame. The detachable wireless charging plate serves as a backrest of the apparatus.

According to a second aspect of the present invention, an apparatus comprises an angled member comprising a channel and a base projecting in a rearward direction from the angled member. The base is configured to support the angled member in a portrait position and in a landscape position. Portrait and landscape flanges respectively project in a frontward direction from the angled member. A detachable wireless charging plate comprises first and second edge surfaces configured to respectively fit within the channel of the angled member. The detachable wireless charging plate, the angled member, and the portrait and landscape flanges are configured to support an electronic device in the portrait position, in the landscape position, and in orientations between the portrait and landscape positions.

According to a third aspect of the present invention, a method involves, while wirelessly and continuously charging an electronic device: supporting the device in one of a portrait position and a landscape position using a stand situated in a first orientation; positionally fixing the device on the stand while the stand is moved from the first orientation to a second orientation; and supporting the device in the other of the portrait position and landscape position using the stand situated in the second orientation.

According to a fourth aspect of the present invention, an apparatus comprises means for supporting an electronic device in one of a portrait position and a landscape position while wirelessly charging the device, means for positionally fixing the device in the portrait position, in the landscape position, and in orientations between the portrait and landscape positions while wirelessly charging the device; and means for supporting the device in the other of the portrait position and landscape position while wirelessly charging the device.

According to a fifth aspect of the present invention, an apparatus comprising a planar member having a first edge surface and a second edge surface. The second edge surface has a length longer than that of the first edge surface. A support arrangement comprises a base attached to the first edge surface and projecting in a rearward direction therefrom. The base is configured to support the planar member in a portrait position and in a landscape position. A first flange projects in a frontward direction from the first edge surface, and a second flange projects in a frontward direction from the second edge surface. The first and second flanges are configured to respectively support first and second edge surfaces of an electronic device and to positionally fix the device in the portrait position, in the landscape position, and in orientations between the portrait and landscape positions.

BRIEF DESCRIPTION OF THE DRAWINGS

For a more complete understanding of example embodiments of the present invention, reference is now made to the following descriptions taken in connection with the accompanying drawings in which:

FIG. 3 (which includes FIGS. 3A and 3B) illustrates a flip-stand configured to receive a detachable wireless charging plate and support an electronic device in both portrait and landscape positions while wirelessly charging the device in accordance with example embodiments of the present invention;

DETAILED DESCRIPTION OF THE DRAWINGS

Example embodiments of the present invention and their potential advantages are understood by referring to FIGS. 1 through 15 of the drawings.

The present disclosure generally relates to stands and other arrangements for supporting an electronic device. In the following description, an example electronic device is shown as a cellular phone, although it will be appreciated that the concepts described herein may be applied to any similar device (e.g., tablet computer or other PDA, navigation device, media player, gaming console, etc.). Example embodiments of the disclosure are directed to a stand for supporting an electronic device in multiple orientations (referred to herein as a "flip-stand" for convenience and not of limitation). Various example embodiments of the disclosure are directed to a stand which incorporates a detachable or integral wireless charging arrangement, and provides for continuous wireless charging of an electronic device while supporting the device in multiple orientations.

The ability to have an electronic device in a good viewing angle during wireless charging has long been desired by consumers. While some charging stations support an electronic device for viewing a clock, weather widgets, social media updates, a music player, etc., in a portrait mode while charging, there is a demand to enable landscape use of such devices for video streaming, web browsing, and other applications that work more naturally in a landscape mode. Due to precise alignment required between inductive charging coils of the charging station and the electronic device to be charged, switching between landscape and portrait positions poses many challenges.

A typical charging station generates an electromagnetic field to transfer energy to an electronic device for recharging the device's battery. In induction charging, for example, an induction coil is used at the charging station to create an alternating electromagnetic field. An induction coil within the electronic device derives power from the electromagnetic field and converts it to electrical current which is used to recharge the device's battery. In order to efficiently transfer the electromagnetic energy, the induction coil of the charging station and that of the electronic device must be within close proximity and in proper alignment.

Figure 1A:
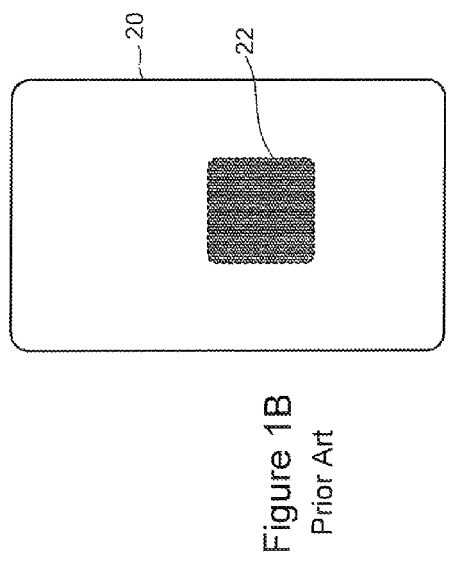
FIG. 1A illustrates a conventional wireless charging stand.
Figure 1B:
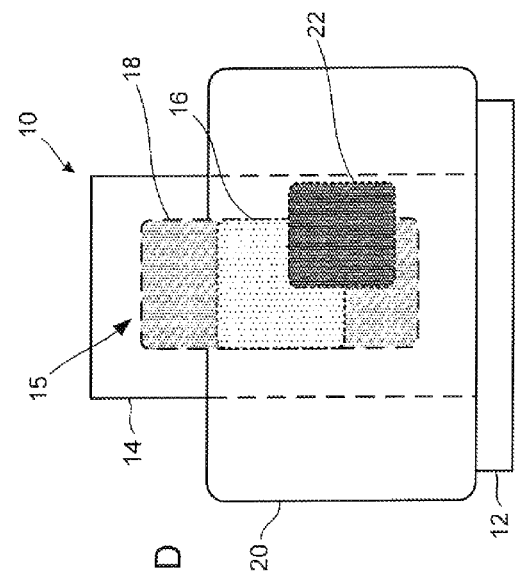
FIG. 1B illustrates a representative electronic device having a receive coil arrangement in accordance with example embodiments of the present invention.
Figure 1C:
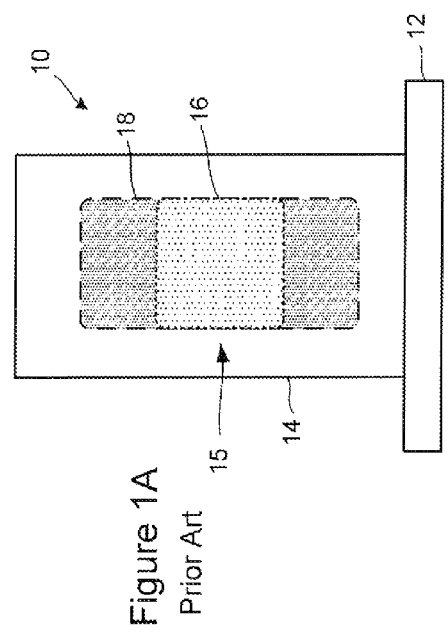
FIG. 1C illustrates a representative electronic device having a receive coil arrangement situated in a portrait position on a conventional wireless charging stand.

FIG. 1A illustrates a conventional wireless charging station 10 having a base 12 to which a backrest 14 is attached. The backrest 14 comprises a charging coil arrangement 15 which can comprise a single charging coil 16 or a multiplicity of charging coils 18. The type and size of the charging coil arrangement 15 varies depending on the desired active area and the charging requirements and component configuration of the device(s) to be charged. FIG. 1B illustrates an example electronic device 20 which comprises a receive coil arrangement 22 coupled to a rechargeable battery 23. FIG. 1C illustrates the electronic device 20 of FIG. 1B situated in a portrait position on the charging station 10 shown in FIG. 1A. In FIG. 1C, it can be seen that the receive coil arrangement 22 of the electronic device 20 is in alignment with the charging coil arrangement 15 of the charging station 10. If the receive coil arrangement 22 of the electronic device 20 is always within a fixed dimension with respect to the bottom of the device 20, charging via the charging coil arrangement 15 can be insured and good user experience achieved using only one charging coil 16. If, however, larger vertical variation is desired, a multiplicity of charging coils 18 can be used. In either of these scenarios, the backrest 14 of the charging station 10 is kept physically smaller than the electronic device 20 to facilitate proper positioning of the device 20 on the charging station 10, thereby achieving proper alignment between the charging coil arrangement 15 and the receive coil arrangement 22.

Figure 1D:
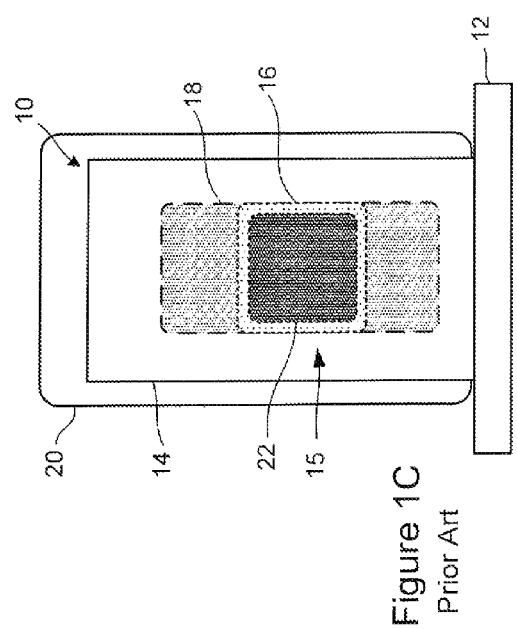
FIG. 1D illustrates a representative electronic device having a receive coil arrangement situated in a landscape position on a conventional wireless charging stand.

FIG. 1D illustrates the electronic device 20 shown in FIG. 1B positioned in a landscape mode on the charging station 10 shown in FIG. 1A. It can be seen in FIG. 1D that the receive coil arrangement 22 of the electronic device 20 is not properly aligned with the charging coil arrangement 15 of the charging station 10. Because of this misalignment, the charging coil arrangement 15 cannot provide sufficient energy to charge the rechargeable battery 23 of the electronic device 20.

One approach to solving the misalignment problem involves increasing the active area of the charging coil arrangement 15 of the charging station 10. This approach, however, is not desirable because it unnecessarily increases hardware costs, electromagnetic field strength (resulting in increased power usage and heat generation), and diminishes the aesthetics of the charging station 10 by requiring the station size to exceed that of the electronic device. Another possible approach to solving the misalignment problem involves detaching a wireless charging module from the charging station and repositioning the charging module in either a portrait or landscape orientation as needed. This approach, however, is not desirable because the charging process and use of the electronic device are interrupted during the repositioning procedure. Also, this approach is susceptible to misalignment between the charging coil arrangement 15 and the receive coil arrangement 22.

Figure 2:
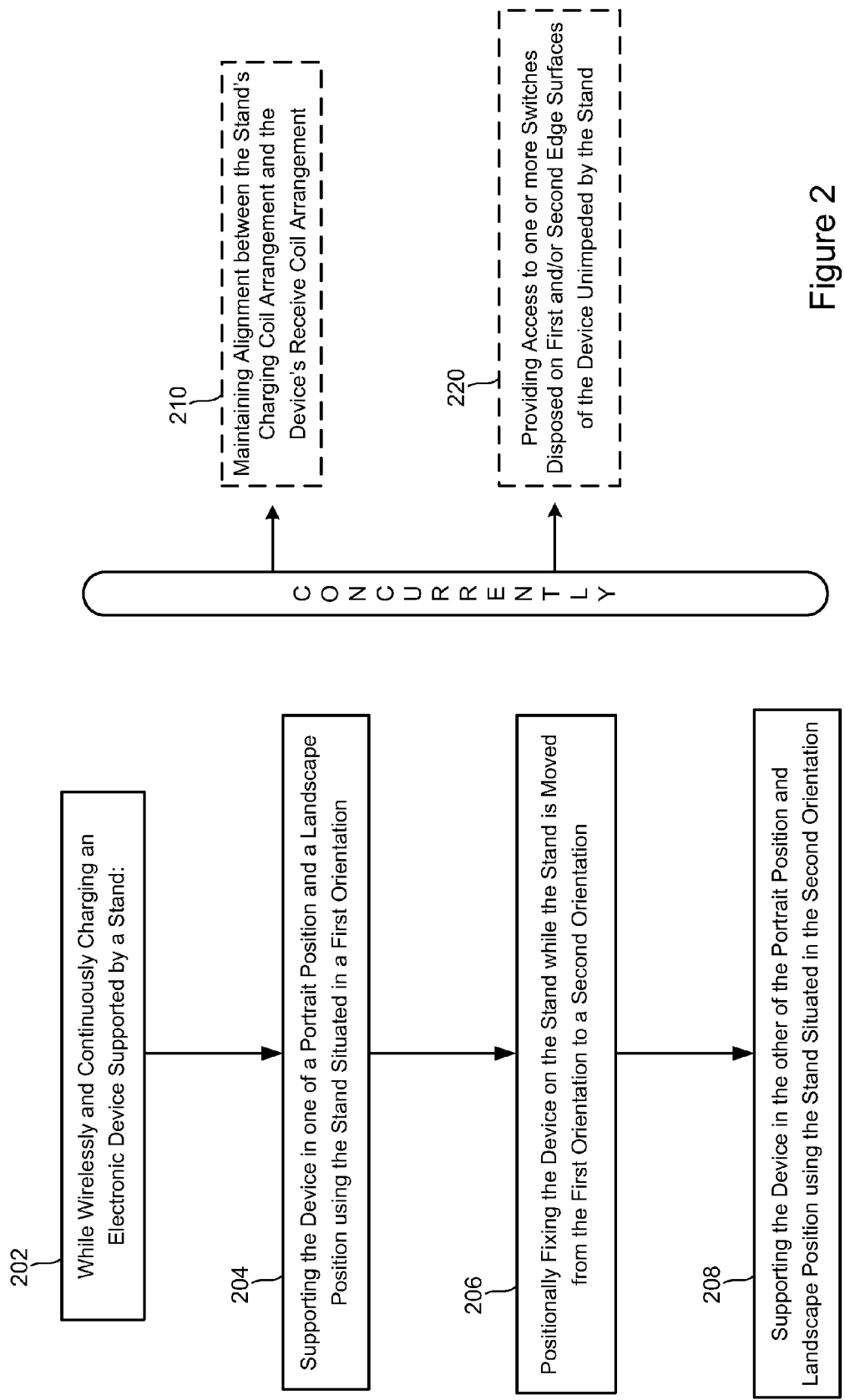
FIG. 2 is a flow diagram showing various processes involving supporting an electronic device between portrait and landscape positions while wirelessly charging the device in accordance with example embodiments of the present invention.

FIG. 2 is a flow diagram showing various processes involving supporting an electronic device between portrait and landscape positions while wirelessly charging the device in accordance with an example embodiment of the present invention. While wirelessly and continuously charging 202 an electronic device supported by a stand, the method involves supporting 204 the device in one of a portrait position and a landscape position using the stand situated in a first orientation. The method also involves positionally fixing 206 the device on the stand while the stand is moved from the first orientation to a second orientation. The method further involves supporting 208 the device in the other of the portrait position and landscape position using the stand situated in the second orientation.

During any of the above-described processes 202, 204, 206, and 208, other processes can occur concurrently in accordance with an example embodiment of the present invention. During any of the aforementioned processes, the method shown in FIG. 2 involves maintaining 210 alignment between the stand's charging coil arrangement and the device's receive coil arrangement. Maintaining coil alignment occurs even when the stand is moved between portrait and landscape positions. Also occurring during any of the aforementioned processes is providing 220 access to one or more switches disposed on first and/or a second edge surfaces of the device, unimpeded by the stand. Unimpeded access to user actuatable switches on the first and/or second edge surfaces of the device allows for uninterrupted use of the electronic device while the stand is oriented in the portrait position or the landscape position, and when the stand is moved between portrait and landscape positions.

FIG. 3 illustrates a flip-stand 100 configured to receive a detachable wireless charging plate 150 and support an electronic device in both portrait and landscape positions while wirelessly charging the device in accordance with example embodiments of the present invention. The term "flip-stand" is used herein as a term of convenience and not of limitation, and generally refers to a stand capable of supporting an object in both a portrait position and a landscape position. The embodiment of a flip-stand 100 shown in FIG. 3A comprises an open frame 102 attached to a base 120. The open frame 102 comprises a first member 104 and a second member 106. The first and second members 104 and 106 respectively comprise a first channel 110 and a second channel 112. The first and second members 104 and 106 are attached to one another at a connection, such that an angle (e.g., about 90 degrees) is defined between the first and second channels 110 and 112. The second member 106 is shown in FIG. 3A as having a length longer than that of the first member 104. The respective lengths of the first and second members 104 and 106 can be varied to achieve a desired aspect ratio corresponding to that of an electronic device or devices to be supported by the stand 100.

A support arrangement of the stand 100 comprises the base 120, which is attached to the first member 104 and projects in a rearward direction therefrom. The base 120 is configured to support the open frame 102 in a portrait position when the stand 100 is situated in a first orientation, and to support the open frame 102 in a landscape position when the stand 100 is situated in a second orientation. The base 120 has a generally trapezoid shape, it being understood that other shapes for the base 120 are contemplated. The base 120 comprises a first support surface 122, which is used primarily to support the stand 100 when oriented in the portrait position. The base 120 further comprises a second support surface 124, which is used primarily to support the stand 100 when oriented in the landscape position. According to the example embodiments shown in FIG. 3A, the structural components of the stand 100 are arranged to form certain angles therebetween. For example, and as previously discussed, an angle $\alpha_1$ (e.g., 90 degrees) is defined between the first and second members 104 and 106. An angle $\alpha_2$ is defined between the second member 106 and the second support surface 124 of the base 120. Angle $\alpha_2$ defines the back-tilt angle of the open frame 102 when the stand 100 is oriented in the portrait position, and can range between about 10 and 45 degrees, for example. An angle $\alpha_3$ (which is equivalent to 90°−$\alpha_4$ for purposes of clarity) is defined between the first member 104 (where it joins the base 120) and the second support surface 124 of the base 120. Angle $\alpha_3$ defines the back-tilt angle of the open frame 102 when the stand 100 is oriented in the landscape position, and can range between about 10 and 45 degrees, for example.

FIG. 3B shows a detachable wireless charging plate 150 which comprises first and second edges 152, 156 configured to respectively fit within the first and second channels 110, 112 of the open frame 102. When properly positioned on the open frame 102, the detachable wireless charging plate 150 serves as a backrest for the stand 100. The detachable wireless charging plate 150 comprises a charging coil arrangement 160. In some embodiments, a single charging coil 162 is provided, while in other embodiments, a multiplicity (e.g., 2, 3 of 4) of charging coils 164 are provided. Because the stand 100 is configured to hold an electronic device in a known, fixed position, the receive coil of the device (which is also known) is positioned on the stand 100 at a predictable position, allowing for a minimal number of coils to be used in order to achieve good usability.

A first flange 130 is shown projecting a frontward direction from the first member 104, and comprises a support surface 131. A second flange 132 projects in a frontward direction from the second member 106, and comprises a support surface 133. The support surface 131 of the first flange 130 forms an acute angle, $\alpha_5$, with respect to the first member 104. The support surface 133 of the second flange 132 forms an acute angle, $\alpha_6$, with respect to the second member 106. The first and second flanges 130, 132 are configured to support an electronic device placed on the stand 100, and are tilted slightly toward the open frame 102 to enhance positional stability of the electronic device when moving the stand 100 between portrait and landscape positions. According to various example embodiments, angles $\alpha_5$ and $\alpha_6$ can range between about 0 and 30 degrees, for example.

In the example embodiment shown in FIG. 3A, a distal terminus 105 of the first member 104 has a closed end, and a distal terminus 107 of the second member 106 also has a closed end. The closed-ended termini 105, 107 abut respective corners 151 and 153 of the detachable wireless charging plate 150 when properly positioned within the open frame 102. According to another example embodiment, one or both of the distal termini 105, 107 can be open ended, allowing one or both of edges surfaces 152, 156 of the charging plate 150 to slide into respective channels 110 and 112 of the first and second members 104, 106 when the charging plate 150 is installed onto the open frame 102.

Figure 5:
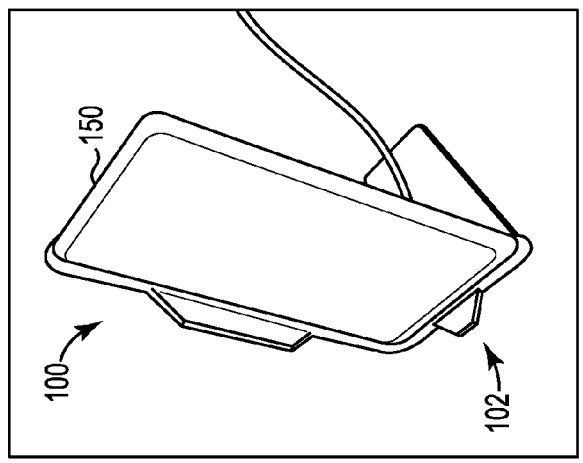
FIGS. 4 and 5 illustrate installation of a detachable wireless charging plate onto a flip-stand in accordance with example embodiments of the present invention.
Figure 4:
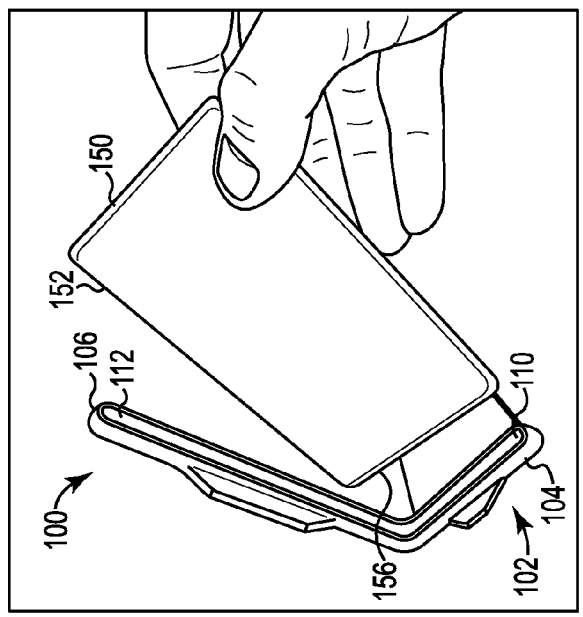

FIGS. 4 and 5 illustrate installation of a detachable wireless charging plate 150 onto an open frame 102 of a flip-stand 100 in accordance with example embodiments of the present invention. FIG. 4 shows a user positioning the charging plate 150 such that a bottom edge surface 156 comes into alignment with the first channel 110 of the first member 104, and a side edge surface 152 comes into alignment with the second channel 112 of the second member 106. FIG. 5 shows the detachable wireless charging plate 150 properly installed on the open frame 102. FIG. 5 shows a power cord 154 of the charging plate 150 exiting from the rear of the flip-stand 100. In a configuration in which the power cord 104 is connected at or near the bottom surface 156 of the charging plate 150, a small notch is provided in the rear portion of the first member 104 to accommodate the power cord 154.

Figure 6:
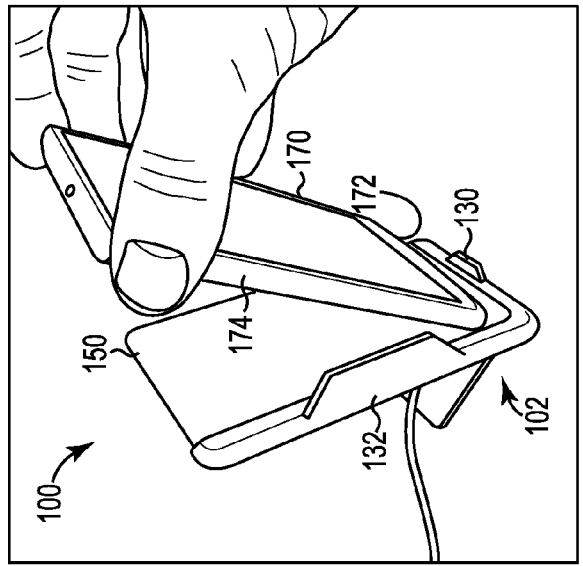
FIG. 6 illustrates placement of an electronic device onto a flip-stand which supports a detachable wireless charging plate in accordance with example embodiments of the present invention.

FIG. 6 illustrates placement of an electronic device 170 onto the flip-stand 100 by a user in accordance with an example embodiment of the present invention. In this example embodiment, the electronic device 170 is shown as a cellular phone, such as a smartphone. In FIG. 6, the user is shown positioning the electronic device 170 such that a bottom surface 172 of the device 170 is aligned with the first flange 130, and a side surface 174 of the device 170 is aligned with the second flange 132 of the open frame 102. When properly positioned on the stand 100, the wireless charging plate 150 serves as a backrest that supports the backside of the electronic device 170.

Figure 7:
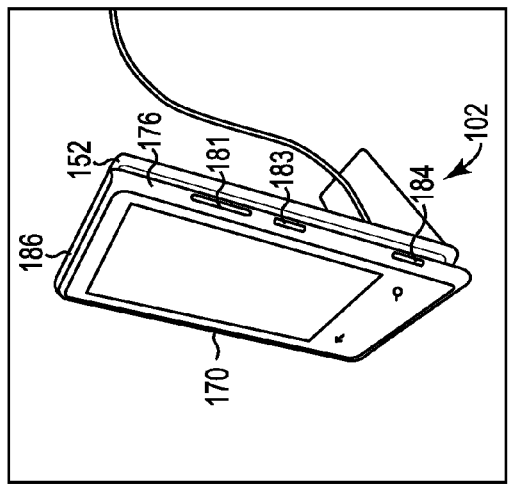
FIG. 7 illustrates an electronic device positionally fixed on a flip-stand oriented in a portrait position and configured to support a detachable wireless charging plate in accordance with example embodiments of the present invention.

FIG. 7 shows the electronic device 170 properly positioned on the flip-stand 100 oriented in a portrait position. It can be seen in FIG. 7 that various switches 181, 183, and 184 of the electronic device 170 are fully accessible to the user, unimpeded by any structural component of the flip-stand 100. It can further be seen in FIG. 7 that any switches, sensors or other components disposed on an upper edge surface 186 of the electronic device 170 are also fully accessible to the user, unimpeded by any structural component of the flip-stand 100. As such, the electronic device 170 is fully operable by the user while wirelessly charging the device 170 with the stand 100 oriented in the portrait position. When oriented in the portrait position, the electronic device 170 rests primarily on the first flange 130 (see FIG. 6). The first and second flanges 130, 132 (see FIG. 6) serve to positionally fix the electronic device 170 at a predictable location relative to the wireless charging plate 150, ensuring proper alignment between charging and receive coils.

Figure 9:
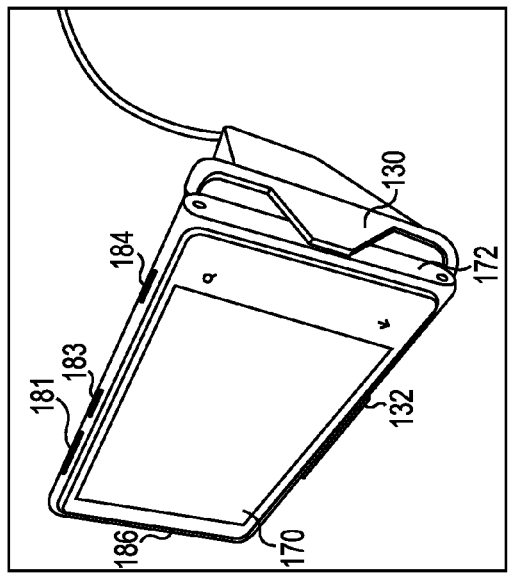
FIGS. 8 and 9 illustrate different views of the arrangement shown in FIG. 7 as the arrangement is moved from a portrait position to a landscape position in accordance with example embodiments of the present invention.
Figure 8:
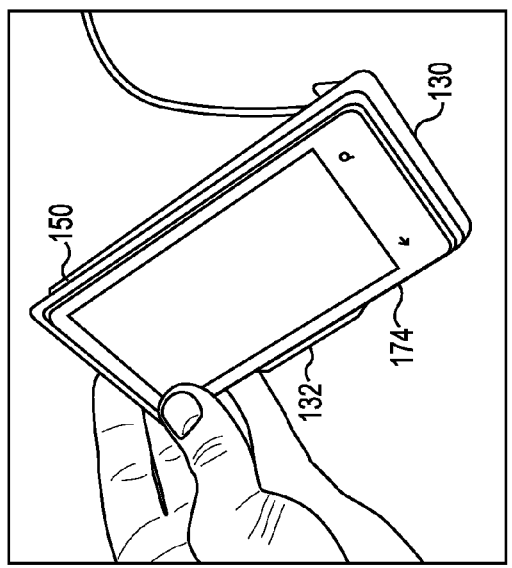

FIGS. 8 and 9 illustrate different views of the arrangement shown in FIG. 7 as the arrangement is moved from a portrait position to a landscape position in accordance with example embodiments of the present invention. FIG. 8 shows a user flipping the stand 100 from the portrait position shown in FIG. 7 to a landscape position shown in FIG. 9. While repositioning the flip-stand 100, the electronic device 170 remains positionally fixed on the stand 100 via first and second flanges 130, 132 and friction between the back surface of the electronic device 170 and the wireless charging plate 150. In addition, the natural way a user grasps the stand and electronic device arrangement provides a compressive force that serves to maintain positioning between the electronic device 170 and the flip-stand 100. As such, wireless charging of the electronic device 170 is not interrupted when changing the orientation of the flip-stand 100 between portrait and landscape positions. Moreover, the electronic device 170 remains fully usable when changing the orientation of the flip-stand 100 between portrait and landscape positions.

FIG. 9 shows the electronic device 170 properly positioned on the flip-stand 100 oriented in the landscape position. When oriented in the landscape position, the electronic device 170 rests primarily on the second flange 130. The first and second flanges 130, 132 serve to positionally fix the electronic device 170 at a predictable location relative to the wireless charging plate 150 (see FIG. 8), ensuring proper alignment between charging and receive coils. FIG. 9 further shows that switches 181, 183, and 184 of the electronic device 170 remain fully accessible to the user, unimpeded by any structural component of the flip-stand 100. It can further be seen in FIG. 9 that any switches, sensors or other components disposed on an upper edge surface 186 of the electronic device 170 also remain fully accessible to the user, unimpeded by any structural component of the flip-stand 100. As such, the electronic device 170 is fully operable by the user while wirelessly charging the device 170 with the stand 100 oriented in the landscape position.

Figure 10:
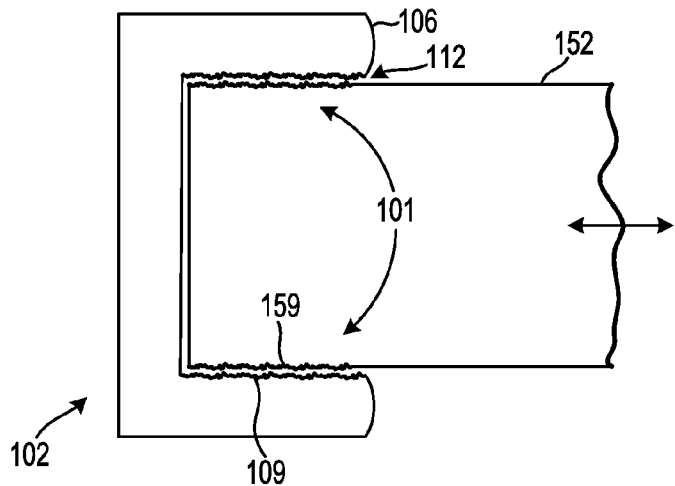
FIGS. 10-12 illustrate different retention arrangements each configured to retain the detachable wireless charging plate within the open frame of a flip-stand in accordance with example embodiments of the present invention.
Figure 11:
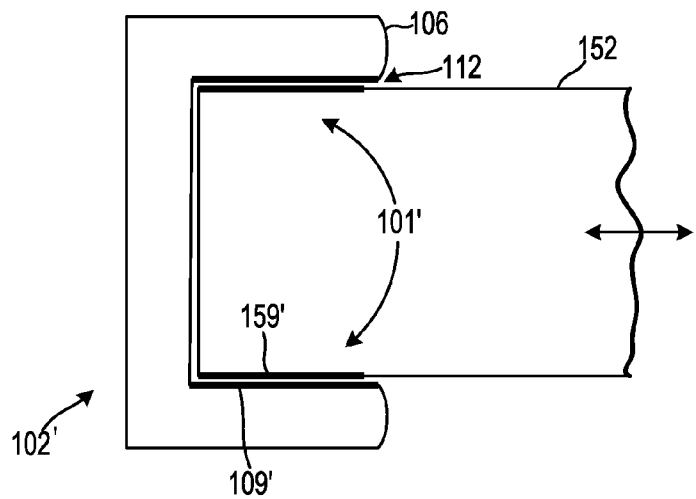
Figure 12:
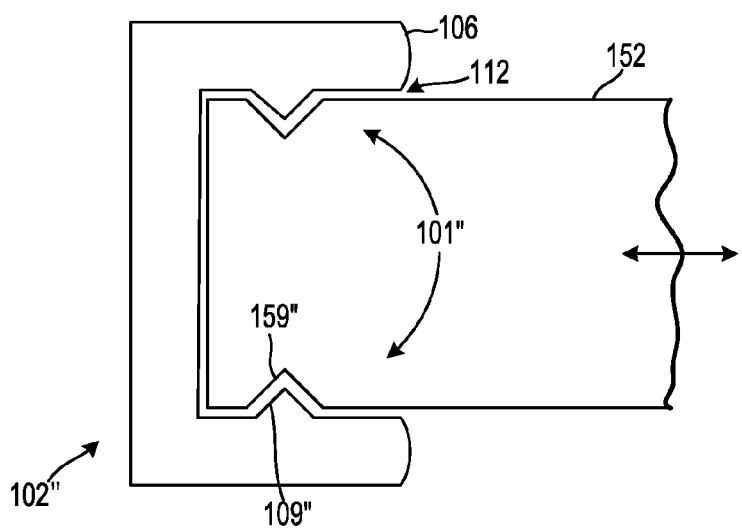

FIGS. 10-12 illustrate different retention arrangements 101, 101' and 101" each configured to retain the detachable wireless charging plate 150 on the open frame 102 of a flip-stand in accordance with example embodiments of the present invention. The example embodiments illustrated in FIGS. 10-12 show different retention arrangements 101, 101' and 101" implemented for retaining the second edge surface 152 of the wireless charging plate 150 within the second channel 112 of the open frame's second member 106. It is understood that the retention arrangements 101, 101' and 101" shown in FIGS. 10-12 can be implemented for retaining the first edge surface 156 (not shown) of the wireless charging plate 150 within the first channel of the open frame's first member 106 (not shown) in addition to, or to the exclusion of, a retention arrangement 101, 101' and 101" implemented for retaining the second edge surface 152 of the wireless charging plate 150 within the second member 106. It is also understood that different retention arrangements 101, 101' and 101" can be used in combination.

According to the example embodiment illustrated in FIG. 10, the wireless charging plate 150 is retained by the open frame 102 via a friction-fit retention arrangement 101. FIG. 10 shows a cross section of the second member 106 of the open frame 102, and a retention arrangement 101 configured to provide a friction generating interface between the second edge surface 152 of the wireless charging plate 150 and a surface of the second channel 112. The friction-fit surfaces 159 and 109 of the retention arrangement 101 shown in FIG. 10 are treated to create a high friction surface, such as by mechanical or chemical treatment of these surfaces. Alternatively, a coating or film can be applied to create the friction-fit surfaces 159 and 109 of the retention arrangement 101. All or selected portions of the second channel 112 (and/or the first channel 110) of the open frame 102 and the second edge surface 152 (and/or the first edge surface 156) of the wireless charging plate 150 can comprise a high-friction retention feature.

According to the example embodiment shown in FIG. 11, the wireless charging plate 150 is retained by the open frame 102 via a magnetic retention arrangement 101'. FIG. 11 shows a retention arrangement 101' configured to provide a magnetic retention force between one or more surfaces of the second channel 112 and the second edge surface 152 of the wireless charging plate 150. The surfaces 159" and 109" of the retention arrangement 101' shown in bold in FIG. 11 comprise magnetic material or a coating or film of magnetic material. All or selected portions of the second channel 112 (and/or the first channel 110) of the open frame 102 and the second edge surface 152 (and/or the first edge surface 156) of the wireless charging plate 150 can comprise a magnetic retention feature.

According to the example embodiment shown in FIG. 12, the wireless charging plate 150 is retained by the open frame 102 via a mechanical retention arrangement 101". FIG. 12 illustrates a retention arrangement 101" configured to provide mechanical latching between one or more surfaces of the second channel 112 and the second edge surface 152 of the wireless charging plate 150. The second edge surface 152 of the wireless charging plate 150 comprises a groove 159" configured to register with a ridge 109" of the second channel 106 of the open frame 102. In one example embodiment, the groove 159" and ridge 109" are substantially ridged, and end-sections of the u-shaped second channel 106 are sufficiently resilient to facilitate forced insertion and extraction of the second edge surface 152 to/from the second channel 106, providing for snap-fit retention and releasing between the two structures. According to another example embodiment, the ridge 109" is sufficiently resilient to compress when the second edge surface 152 is inserted into the second channel 106. When the ridge 109" comes into alignment with the groove 159", the resilient ridge 109" expands into the groove 159", providing for mechanical capture between the two structures. Exerting a tensile force between the open frame 102 and the wireless charging plate 150 causes the resilient ridge 159" to again compress, allowing the user to forcibly separate the wireless charging plate 150 from the open frame 102.

Figure 13:
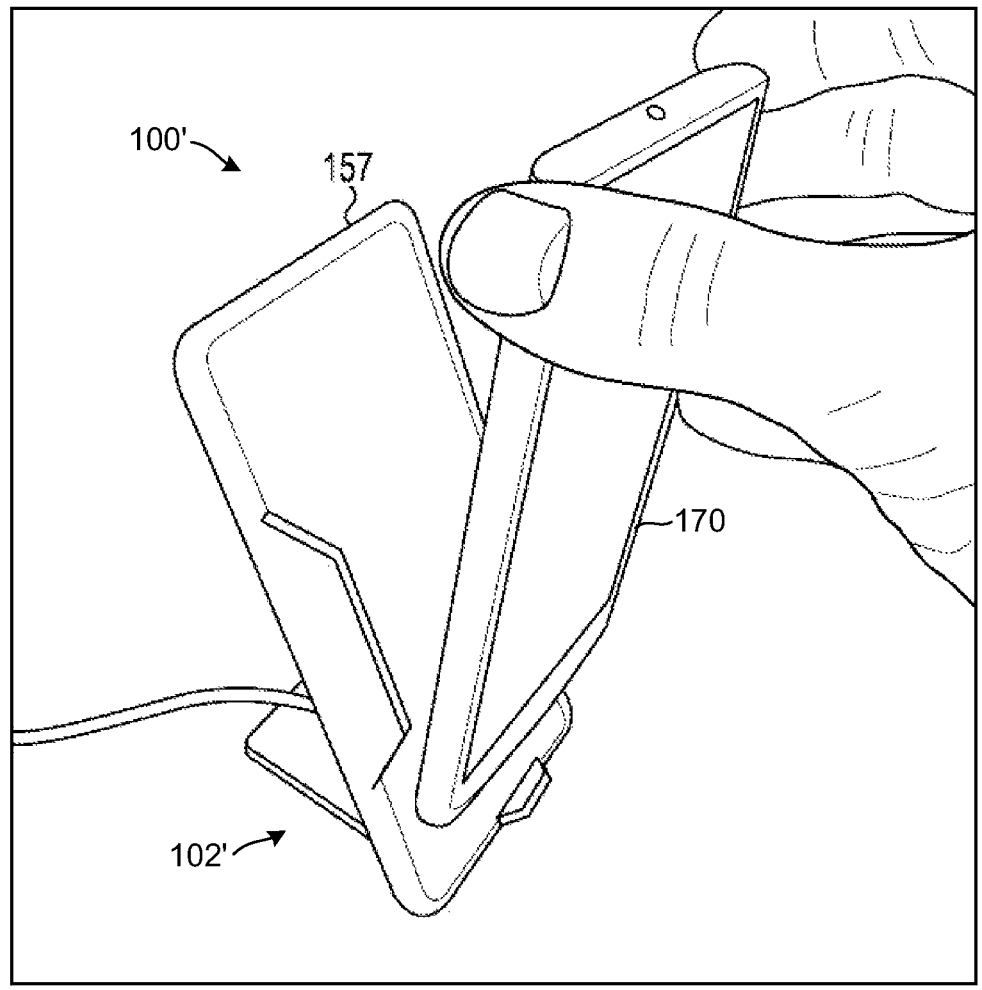
FIG. 13 illustrates a flip-stand configured to support an integral charging plate in accordance with example embodiments of the present invention.

FIG. 13 illustrates a flip-stand 100' configured to support an integral wireless charging plate in accordance with example embodiments of the present invention. In the example embodiment shown in FIG. 13, the open frame 102' and wireless charging plate 157 define a unitary structure. In other words, the wireless charging plate 157 in the example embodiment illustrated in FIG. 13 is not separable from the open frame 102'. The flip-stand 100' shown in FIG. 13 incorporates structural features of previously described embodiments that provide for continuous wireless charging and use of an electronic device 170 when selectively positioned in portrait and landscape positions.

Figure 14:
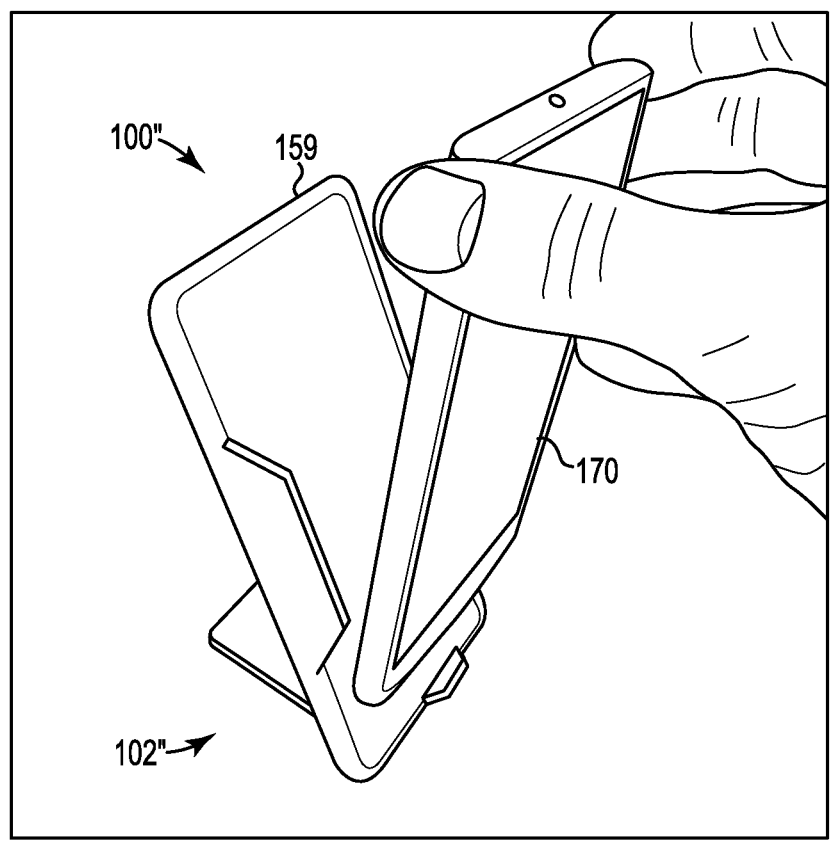
FIG. 14 illustrates a flip-stand in accordance with example embodiments of the present invention.

FIG. 14 illustrates a flip-stand 100" which supports an integral open frame 102" and backrest 159 in accordance with example embodiments of the present invention. In the example embodiment shown in FIG. 14, the stand 100" comprises a backrest 159 which forms a unitary structure with the open frame 102". The backrest 159 in this example embodiment does not incorporate wireless charging components. The flip-stand 100" illustrated in FIG. 14 incorporates structural features of previously described embodiments that positionally fix and provide for continuous use of an electronic device 170 when selectively positioned in portrait and landscape positions.

According to example embodiments, a flip-stand is constructed from plastic or a composite material. Structural components of the flip-stand, such as the open frame, can be fabricated using a molding process. One or more structural components of the flip-stand can be fabricated as separate components (e.g., the base and the open frame), then assembled by the user.

Figure 15:
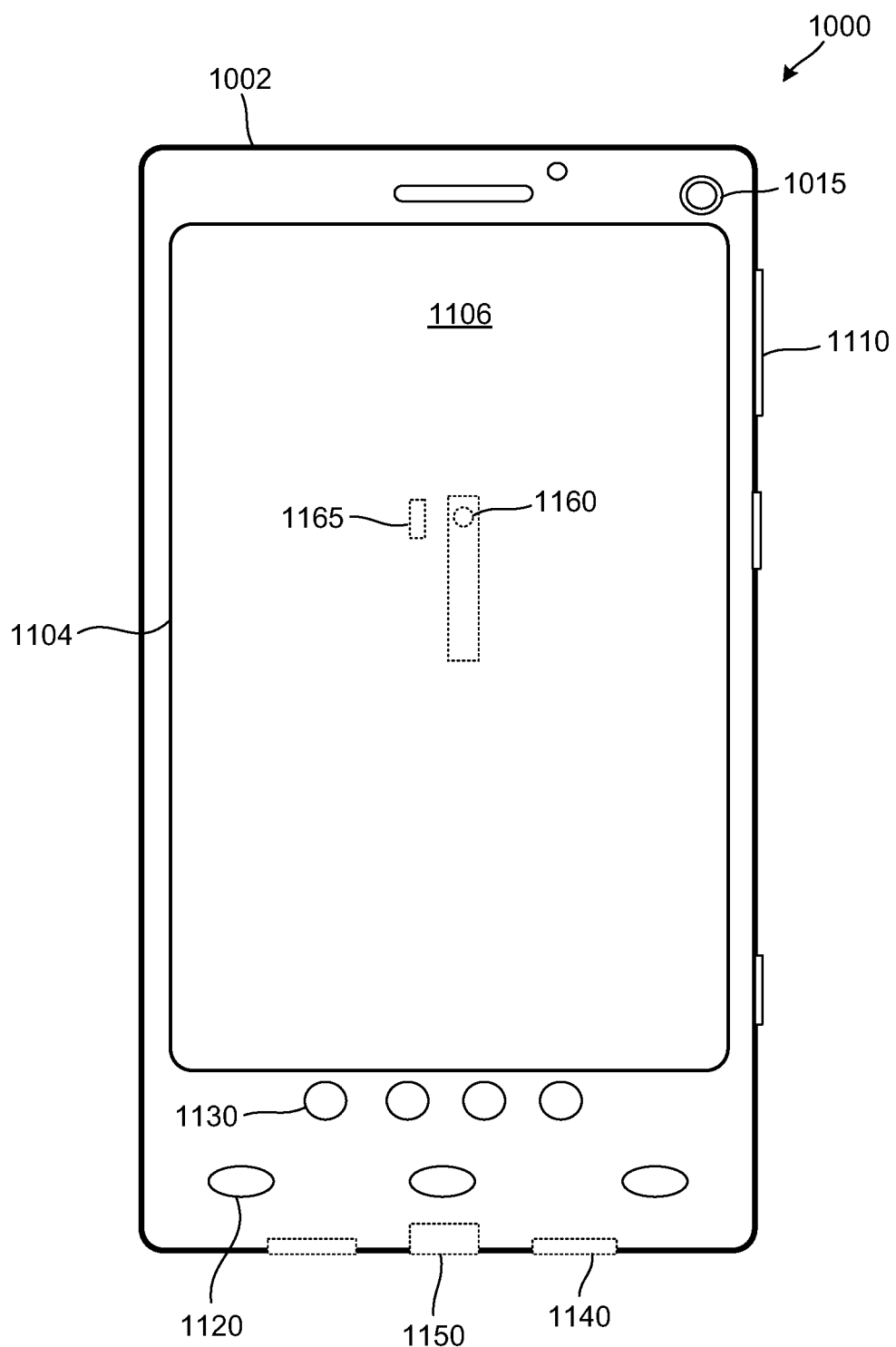
FIG. 15 illustrates a representative electronic device in accordance with embodiments of the present invention.

FIG. 15 illustrates a representative electronic device that can be selectively supported in both portrait and landscape positions in accordance with example embodiments of the present invention. FIG. 15 illustrates a representative electronic device 1000, which comprises a hand-held housing 1002 within which various components are housed or supported. A display 1004 is provided on an upper surface of the electronic device 1000. In some configurations, the display 1004 is implemented as a display device, such as a liquid crystal display. In other embodiments, the display 1004 is implemented as a touch screen, which facilitates tactile interaction with software, applications and other functions supported by the electronic device 1000. In other embodiments, the display 1004 may be implemented as a hovering sensing display which detects an input, such as a finger, pen or stylus, above the display.

According to various example embodiments, the upper surface of the electronic device 1000 comprises a number of soft key buttons 1130 and hard key buttons 1120 for invoking specified functions or sets of functions. One or more manually actuatable switches 1110 are provided along one or more sides of the housing 1002 which allow user control of specified functions, such as changing the volume of speakers 1140 and turning on and off device power. The housing 1002 incorporates an input/output interface connector 1150, such as a USB connector. In some embodiments, the electronic device 1000 incorporates a first camera 1160 (shown in phantom) provided on a lower surface of the housing 1002. A flash assembly 1165 is provided on the lower surface of the housing 1002 proximate the first camera 1160. A second camera 1015 is optionally provided on the upper surface of the housing 1002. According to some embodiments, the electronic device 1000 may comprise one or more radios, such as a cellular radio, a Wi-Fi radio, a Bluetooth radio, or other radio technology.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
an angled member comprising a channel;
a base projecting in a rearward direction from the angled member, the base configured to support the angled member in a portrait position and in a landscape position;
portrait and landscape flanges respectively projecting in a frontward direction from the angled member; and
a detachable wireless charging plate comprising first and second edge surfaces configured to respectively fit within the channel of the angled member;
wherein the detachable wireless charging plate, the angled member, and the portrait and landscape flanges are configured to support an electronic device in the portrait position, in the landscape position, and in orientations between the portrait and landscape positions.

2. The apparatus of claim 1, wherein:
the angled member comprises a first member and a second member; and
an angle of about 90 degrees is defined between the first and second members.

3. The apparatus of claim 1, wherein:
the base comprises a first support surface and a second support surface;
the first support surface is configured to support the angled frame in the portrait position; and
the second support surface is configured to support the angled frame in the landscape position.

4. The apparatus of claim 1, wherein:
the base comprises a first support surface and a second support surface;
the first support surface is configured to support the angled frame in the portrait position and the second support surface is configured to support the angled frame in the landscape position;
a first acute angle is defined between the first support surface of the base and the angled frame; and
a second acute angle is defined between the second support surface of the base and the angled frame.

5. The apparatus of claim 1, wherein the channel and at least one of the first and second edge surfaces of the charging plate comprise a retention arrangement configured to:
provide a friction generating interface therebetween; or
provide for magnetic retention therebetween; or
provide mechanical retention therebetween.

6. The apparatus of claim 1, wherein:
the angled member comprises a first member and a second member;

a length of the first member is substantially the same as a length of the first edge surface of the charging plate; and a length of the second member is substantially the same as a length of the second edge surface of the charging plate.

7. The apparatus of claim 1, wherein:
the angled member comprises a first member and a second member; and
a length of the second member is greater than a length of the first member.

8. The apparatus of claim 1, wherein:
the electronic device comprises a receive coil arrangement; and
the portrait and landscape flanges are configured to provide fixed support for the device such that alignment is maintained between the receive coil arrangement of the device and a charging coil arrangement of the detachable wireless charging plate in the portrait position, in the landscape position, and in orientations between the portrait and landscape positions.

9. The apparatus of claim 1, wherein:
the electronic device comprises a first side surface and a second side surface;
at least one of the first and second side surfaces comprise one or more switches; and
the one or more switches are unimpeded by the apparatus and are user accessible in the portrait position, in the landscape position, and in orientations between the portrait and landscape positions.

10. An apparatus, comprising:
an open frame, comprising:
  a first member comprising a first channel; and
  a second member comprising a second channel, the second member having a length longer than that of the first member and connected thereto, such that an angle is defined between the first and second channels;
a support arrangement, comprising:
a base attached to the first member and projecting in a rearward direction therefrom, the base configured to support the open frame in a portrait position and in a landscape position;
a first flange projecting in a frontward direction from the first member; and
a second flange projecting in a frontward direction from the second member; and
a detachable wireless charging plate comprising first and second edge surfaces configured to respectively fit within the first and second channels of the open frame, the detachable wireless charging plate serving as a backrest of the apparatus.

11. The apparatus of claim 10, wherein the angle defined between the first and second channels is about 90 degrees.

12. The apparatus of claim 10, wherein:
the base comprises a first support surface and a second support surface;
the first support surface is configured to support the open frame in the portrait position; and
the second support surface is configured to support the open frame in the landscape position.

13. The apparatus of claim 10, wherein:
the base comprises a first support surface and a second support surface;
the first support surface is configured to support the open frame in the portrait position and the second support surface is configured to support the open frame in the landscape position;
a first acute angle is defined between the first support surface of the base and the second member of the open frame; and
a second acute angle is defined between the second support surface of the base and the first member of the open frame.

14. The apparatus of claim 10, wherein at least one of the first and second channels and at least one of the first and second edge surfaces of the charging plate comprise a retention arrangement configured to:
provide a friction generating interface therebetween; or
provide for magnetic retention therebetween; or
provide mechanical retention therebetween.

15. The apparatus of claim 10, wherein:
a length of the first channel is substantially the same as a length of the first edge surface of the charging plate; and
a length of the second channel is substantially the same as a length of the second edge surface of the charging plate.

16. The apparatus of claim 10, wherein:
a first acute angle is defined between the first flange and the first member of the open frame; and
a second acute angle is defined between the second flange and the second member of the open frame.

17. The apparatus of claim 10, wherein the open frame, the charging plate, and the first and second flanges are configured to support an electronic device in the portrait position, in the landscape position, and in orientations between the portrait and landscape positions.

18. The apparatus of claim 10, wherein:
the detachable wireless charging plate and the open frame are configured to support an electronic device comprising a receive coil arrangement; and
the first and second flanges are configured to provide fixed support for the device in the portrait and landscape positions, such that alignment is maintained between the receive coil arrangement of the device and a charging coil arrangement of the detachable wireless charging plate in the portrait position, in the landscape position, and in orientations between the portrait and landscape positions.

* * * * *